(12) United States Patent
Iwanaga et al.

(10) Patent No.: US 8,053,109 B2
(45) Date of Patent: Nov. 8, 2011

(54) NON-AQUEOUS ELECTROLYTE SECONDARY BATTERY

(75) Inventors: Masato Iwanaga, Moriguchi (JP); Noriko Yamashita, Moriguchi (JP); Koji Abe, Ube (JP); Kazuhiro Miyoshi, Ube (JP)

(73) Assignees: Sanyo Electric Co., Ltd., Moriguchi-shi (JP); Ube Industries, Ltd., Ube-shi (JP)

( * ) Notice: Subject to any disclaimer, the term of this patent is extended or adjusted under 35 U.S.C. 154(b) by 264 days.

(21) Appl. No.: 12/271,045

(22) Filed: Nov. 14, 2008

(65) Prior Publication Data

US 2009/0130566 A1 May 21, 2009

(30) Foreign Application Priority Data

Nov. 16, 2007 (JP) ................................ 2007-298656

(51) Int. Cl.
*H01M 6/04* (2006.01)

(52) U.S. Cl. ........ 429/199; 429/188; 429/324; 429/326; 429/330; 429/200; 429/231.3; 429/231.1; 429/231.6; 429/334; 429/342; 429/323; 429/224; 429/223; 429/218.1; 252/62.2

(58) Field of Classification Search .................. 429/199, 429/188, 324, 326, 330, 200, 231.3, 231.1, 429/231.6, 334, 342, 323, 224, 223, 218.1; 252/62.2
See application file for complete search history.

(56) References Cited

U.S. PATENT DOCUMENTS

| | | | |
|---|---|---|---|
| 7,261,975 B2 * | 8/2007 | Abe et al. | 429/199 |
| 7,297,442 B2 * | 11/2007 | Abe et al. | 429/199 |
| 7,438,991 B2 * | 10/2008 | Nishida et al. | 429/231.3 |
| 7,754,380 B2 * | 7/2010 | Abe et al. | 429/199 |
| 2005/0255384 A1 | 11/2005 | Abe et al. | |
| 2006/0166096 A1 | 7/2006 | Abe et al. | |
| 2006/0199077 A1 * | 9/2006 | Iwanaga et al. | 429/231.3 |
| 2007/0054185 A1 | 3/2007 | Abe et al. | |
| 2007/0172730 A1 * | 7/2007 | Iwanaga et al. | 429/200 |
| 2008/0233485 A1 * | 9/2008 | Jito et al. | 429/332 |
| 2009/0053598 A1 * | 2/2009 | Abe et al. | 429/199 |

FOREIGN PATENT DOCUMENTS

| | | | |
|---|---|---|---|
| JP | 63-152886 A | | 6/1988 |
| JP | 10-116631 | * | 5/1998 |
| JP | 2000-40524 A | | 2/2000 |
| JP | 2000-195545 A | | 7/2000 |
| JP | 2001-313071 A | | 11/2001 |
| JP | 2005-285630 A | | 10/2005 |
| JP | 2006-351337 A | | 12/2006 |
| JP | 2007-200688 A | | 8/2007 |
| WO | 03/077351 A1 | | 9/2003 |
| WO | 2005/029631 A1 | | 3/2005 |

* cited by examiner

*Primary Examiner* — Laura Weiner

(74) *Attorney, Agent, or Firm* — Westerman, Hattori, Daniels & Adrian, LLP

(57) ABSTRACT

A non-aqueous electrolyte secondary battery has a high initial capacity and excels in cycle characteristics and storage characteristics even when charged until the potential of the positive electrode active material exceeds as high as 4.3V versus lithium. The non-aqueous electrolyte of the secondary battery contains both 1,3-dioxane and a sulfonic acid ester compound.

12 Claims, No Drawings

NON-AQUEOUS ELECTROLYTE SECONDARY BATTERY

BACKGROUND OF THE INVENTION

1. Field of the Invention

The present invention relates to non-aqueous electrolyte secondary batteries, and more particularly, to non-aqueous electrolyte secondary batteries excellent in cycle characteristics and charge storage characteristics.

2. Background Art

Mobile information terminals such as portable telephones and notebook personal computers are increasingly sophisticated and increasingly reduced in size and weight these days. These terminals use as mobile power supplies a variety of non-aqueous electrolyte secondary batteries typified by lithium ion secondary batteries having a high-energy density and a high capacity.

In recent years, these batteries are expected to have a higher capacity to meet the demand for higher sophistication of these devices.

One technique known to increase battery capacity is to improve the use efficiency of a positive electrode active material by charging a positive electrode until the potential of the positive electrode active material exceeds 4.3V versus lithium.

However, charging to high voltages accelerates undesirable reactions such as oxidative decomposition of an electrolyte on the positive electrode side, thereby causing degradation in cycle characteristics. Moreover, if a battery in a charged state is stored at high temperatures, there may be a decrease in discharge capacity after storage or an increase in the thickness of the battery due to gas generated by the reaction between the positive electrode and an electrolytic solution.

To improve the cycle characteristics and charge storage characteristics of non-aqueous electrolyte secondary batteries, it has been proposed to add a sulfonic acid ester compound to a non-aqueous electrolytic solution.

For example, Patent Document 1 shows a technique in which a sulfonic acid ester compound is added to an electrolyte so as to increase the open circuit voltage between battery terminals after charging to high voltages.

Patent Document 2 shows a technique in which a sulfonic acid ester compound such as 1,4-butanediol dimethanesulfonate is added to an electrolyte so as to produce a battery having a large charge-discharge capacity and little degradation during high-temperature storage in a charged state.

Patent Documents 3 to 6 each show a technique in which a sulfonic acid ester compound is added to an electrolytic solution so as to improve cycle characteristics and other features of non-aqueous electrolyte secondary batteries.

Patent Documents 7 and 8 each show a technique in which a 1,3-dioxane-based solvent is used to improve the charge-discharge characteristics of a non-aqueous electrolyte.

Patent Document 1: Japanese Patent Unexamined Publication No. 2006-351337
Patent Document 2: Japanese Patent Unexamined Publication No. 2005-285630
Patent Document 3: WO2003/077351
Patent Document 4: WO2005/029631
Patent Document 5: Japanese Patent Unexamined Publication No. 2000-195545
Patent Document 6: Japanese Patent Unexamined Publication No. 2001-313071
Patent Document 7: Japanese Patent Unexamined Publication No. S63-152886
Patent Document 8: Japanese Patent Unexamined Publication No. 2000-40524

SUMMARY OF THE INVENTION

The inventors of the present invention have performed detailed analysis of the aforementioned conventional art and found the following three facts. First, adding 1,3-dioxane as an additive to a non-aqueous electrolyte can reduce oxidative decomposition of an electrolytic solution in a positive electrode, but decreases the initial capacity of a battery due to a side reaction caused in a negative electrode during the initial charge.

Second, replacing 1,3-dioxane by 1,4-dioxane, which is an isomer of 1,3-dioxane, causes a battery to expand larger than in the case of using 1,3-dioxane.

Third, the conventional non-aqueous electrolyte secondary batteries are charged until the potential of a positive electrode active material exceeds 4.3V versus lithium, their cycle characteristics are insufficient at large cycle numbers such as 300 or more.

In view of these findings, it is an object of the present invention to provide a non-aqueous electrolyte secondary battery excellent in cycle characteristics and charge storage characteristics, particularly during charging to high voltages.

To achieve the aforementioned object, a non-aqueous electrolyte secondary battery having the basic structure (a first aspect) of the present invention includes:

a positive electrode having a positive electrode active material;

a negative electrode having a negative electrode active material; and a non-aqueous electrolyte containing a non-aqueous solvent, an electrolyte salt, 1,3-dioxane, and a sulfonic acid ester compound.

The basic structure enables to provide a non-aqueous electrolyte battery excellent in cycle characteristics and charge storage characteristics. The reason for this is considered as follows. In general, 1,3-dioxane causes a side reaction on the negative electrode side and decreases the initial capacity of the battery. In the basic structure, on the other hand, a sulfonic acid ester compound, which is added to the non-aqueous electrolyte together with 1,3-dioxane, itself forms a protective layer for the negative electrode prior to (more readily than) the side reaction caused by 1,3-dioxane in the negative electrode. The protective layer suppresses the side reaction of 1,3-dioxane. As a result, the initial capacity is prevented from decreasing, and hence characteristic values such as cycle characteristics and charge storage characteristics are improved.

In the basic structure, the 1,3-dioxane content of the non-aqueous electrolyte may be in the range of 0.3 to 3% by mass (a second aspect).

When the 1,3-dioxane content of the non-aqueous electrolyte is less than 0.3% by mass, this decreases a post-storage capacity return rate, whereas when it exceeds 3% by mass, the cycle characteristics tend to deteriorate. This is the reason why the 1,3-dioxane content of the non-aqueous electrolyte is preferably in the range of 0.3 to 3% by mass, where further excellent cycle characteristics can be obtained while maintaining a good post-storage capacity return rate.

In the basic structure of the present invention, the sulfonic acid ester compound may be a compound selected from the group consisting of pentafluorophenyl methanesulfonate shown in Chemical Formula 1 and the compounds shown in Chemical Formulas 2, 3, and 4 (a third aspect).

Chemical Formula 1

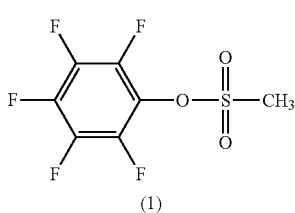

(1)

Chemical Formula 2

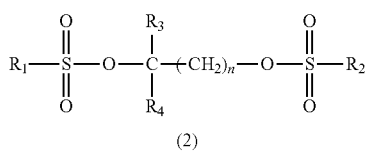

(2)

where $R_1$ and $R_2$ each represents an alkyl group, a haloalkyl group, or an aryl group, $R_3$ and $R_4$ each represents a hydrogen atom or a methyl group, and n is an integer of 1 to 5.

Chemical Formula 3

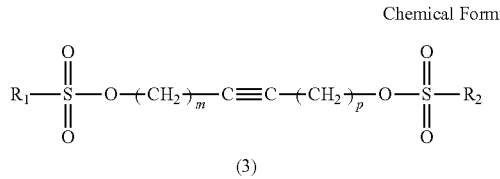

(3)

where $R_1$ and $R_2$ each represents an alkyl group, a haloalkyl group, or an aryl group, and m and p are each either 1 or 2.

Chemical Formula 4

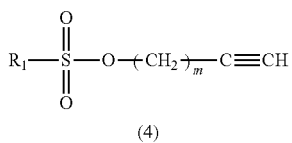

(4)

where $R_1$ is an alkyl group, a haloalkyl group, or an aryl group, and m is either 1 or 2.

In the non-aqueous electrolyte battery of the third aspect, the 1,3-dioxane content of the non-aqueous electrolyte may be in the range of 0.3 to 3% by mass (a fourth aspect).

In the basic structure of the present invention, the sulfonic acid ester compound may include at least one of the compounds shown in Chemical Formulas 2, 3, and 4;

(i) in Chemical Formula 2, $R_1$ and $R_2$ each represents an alkyl group having 1 to 6 carbon atoms, a haloalkyl group having 1 to 6 carbon atoms, or an aryl group having 6 to 12 carbon atoms, $R_3$ and $R_4$ each represents a hydrogen atom or a methyl group, and n is an integer of 1 to 5;

(ii) in Chemical Formula 3, $R_1$ and $R_2$ each represents an alkyl group having 1 to 6 carbon atoms, a haloalkyl group having 1 to 6 carbon atoms, or an aryl group having 6 to 12 carbon atoms, and m and p are each either 1 or 2; and (iii) in Chemical Formula 4, $R_1$ is an alkyl group having 1 to 6 carbon atoms, a haloalkyl group having 1 to 6 carbon atoms, or an aryl group having 6 to 12 carbon atoms, and m is either 1 or 2 (a fifth aspect).

In the non-aqueous electrolyte battery of the fifth aspect, the 1,3-dioxane content of the non-aqueous electrolyte may be in the range of 0.5 to 2% by mass (a sixth aspect).

In the non-aqueous electrolyte battery of the sixth aspect, the sulfonic acid ester compound content of the non-aqueous electrolyte may be in the range of 0.1 to 3% by mass (a seventh aspect). The reason for this as follows. When the sulfonic acid ester compound content of the non-aqueous electrolyte is less than 0.1% by mass, this decreases the effect of reducing the initial capacity which is expected to be achieved by the addition of 1,3-dioxane. When it exceeds 2% by mass, on the other hand, the battery tends to be expanded during storage.

In the non-aqueous electrolyte battery of the seventh aspect, the positive electrode active material may have a potential of more than 4.3V and not more than 5.1V versus lithium (an eighth aspect). The positive electrode active material may be a mixture of a lithium-cobalt composite oxide and a lithium-manganese-nickel composite oxide, the lithium-cobalt composite oxide containing zirconium and magnesium, and the lithium-manganese-nickel composite oxide having a layered structure (a ninth aspect). In this structure, the potential of the positive electrode active material can be more than 4.4V and not more than 4.6V versus lithium.

The battery thus structured can have a higher capacity than conventional general purpose batteries which are charged until the potential of a positive electrode active material reaches 4.3V or less versus lithium, and can also have high positive-electrode stability and excellent resistance to charging to high voltages. This results in a non-aqueous electrolyte secondary battery having a high capacity and excelling in cycle characteristics and storage characteristics. When a lithium-cobalt composite oxide is used as a component of the positive electrode active material, it is not preferable that the potential of the positive electrode active material exceeds 5.1V versus lithium because it decreases the stability of the material.

In the non-aqueous electrolyte battery of the basic structure of the present invention, the sulfonic acid ester compound may be a compound selected from the group consisting of pentafluorophenyl methanesulfonate, 1,4-butanediol dimethanesulfonate, 1,2-propanediol dimethanesulfonate, and 2-butyne-1,4-diol dimethanesulfonate (a tenth aspect).

In the non-aqueous electrolyte battery of the tenth aspect, the 1,3-dioxane content of the non-aqueous electrolyte may be in the range of 0.5 to 2% by mass (an eleventh aspect).

In the non-aqueous electrolyte battery of the eleventh aspect, the sulfonic acid ester compound content of the non-aqueous electrolyte may be in the range of 0.1 to 3% by mass (a twelfth aspect).

In the non-aqueous electrolyte battery of the twelfth aspect, the positive electrode active material may have a potential of more than 4.3V and not more than 5.1V versus lithium (a thirteenth aspect). The positive electrode active material may be a combination of a lithium-cobalt composite oxide and a lithium-manganese-nickel composite oxide, the lithium-cobalt composite oxide including zirconium and magnesium, and the lithium-manganese-nickel composite oxide having a layered structure (a fourteenth aspect).

In this structure, the potential of the positive electrode active material may be more than 4.4V and not more than 4.6V versus lithium.

The present invention including the aforementioned aspects provides a non-aqueous electrolyte secondary battery having a high initial capacity and excelling in cycle characteristics and charge storage characteristics even when charged until the potential of the positive electrode active material exceeds as high as 4.3V versus lithium.

DETAILED DESCRIPTION OF THE INVENTION

The best mode of the present invention is described in detail as follows using examples. The non-aqueous electrolyte secondary battery of the present invention features in that the electrolyte contains both 1,3-dioxane and a sulfonic acid ester compound.

Examples of the sulfonic acid ester compound used in the non-aqueous electrolyte secondary battery of the present invention are shown in Chemical Formulas 1 to 4 below.

Chemical Formula 1

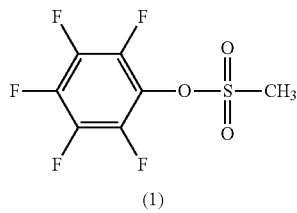

(1)

Chemical Formula 2

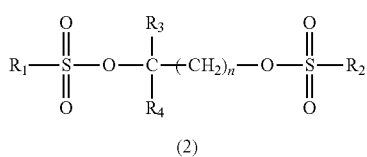

(2)

The compound shown in Chemical Formula 1 is pentafluorophenyl methanesulfonate. In Chemical Formula 2, $R_1$ and $R_2$ each represents an alkyl group, a haloalkyl group, or an aryl group, $R_3$ and $R_4$ each represents a hydrogen atom or a methyl group, and n is an integer of 1 to 5.

$R_1$ and $R_2$ each preferably represents an alkyl group having 1 to 6 carbon atoms, a haloalkyl group having 1 to 6 carbon atoms, or an aryl group having 6 to 12 carbon atoms. $R_3$ and $R_4$ each preferably represents a hydrogen atom or a methyl group. And n is preferably an integer of 1 to 3.

$R_1$ and R2 each more preferably represents an alkyl group, such as a methyl group or an ethyl group, having 1 to 2 carbon atoms; a haloalkyl group, such as a trifluoromethyl group or a 2,2,2-trifluoroethyl group, having 1 to 2 carbon atoms; or an aryl group, such as a phenyl group or a p-tolyl group, having 6 to 9 carbon atoms. $R_3$ and $R_4$ each more preferably represents a hydrogen atom or a methyl group. And n is more preferably an integer of 1 to 3, and further preferably 3.

The number of carbon atoms of $R_1$ and $R_2$ is preferably 7 or less because when it is 8 or more, these groups may cause the reaction between the sulfonic acid ester compound and the remaining non-aqueous electrolyte components to be subjected to steric hindrance or other problems, making it harder to get the desired effect.

Chemical Formula 3

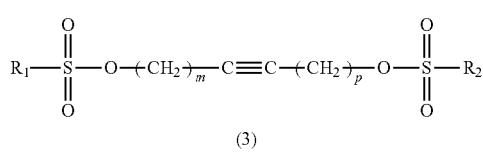

(3)

In Chemical Formula 3, $R_1$ and $R_2$ each represents an alkyl group, a haloalkyl group, or an aryl group, and m and p are each either 1 or 2.

$R_1$ and $R_2$ each preferably represents an alkyl group having 1 to 6 carbon atoms, a haloalkyl group having 1 to 6 carbon atoms, or an aryl group having 6 to 12 carbon atoms. And m and p are each preferably either 1 or 2.

$R_1$ and $R_2$ each more preferably represents an alkyl group, such as a methyl group or an ethyl group, having 1 to 2 carbon atoms; a haloalkyl group, such as a trifluoromethyl group or a 2,2,2-trifluoroethyl group, having 1 to 2 carbon atoms; or an aryl group, such as a phenyl group or a p-tolyl group, having 6 to 9 carbon atoms. And m and p are each more preferably either 1 or 2, and further preferably 1.

The reason why the numbers of carbon atoms of $R_1$ and $R_2$ are preferably 7 or less is the same as in the case of Chemical Formula 2 described above.

Chemical Formula 4

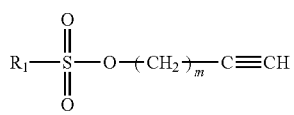

(4)

In Chemical Formula 4, $R_1$ represents an alkyl group, a haloalkyl group, or an aryl group, and m is either 1 or 2.

$R_1$ preferably represents an alkyl group having 1 to 6 carbon atoms, a haloalkyl group having 1 to 6 carbon atoms, or an aryl group having 6 to 12 carbon atoms, and m is preferably either 1 or 2.

$R_1$ is more preferably an alkyl group, such as a methyl group or an ethyl group, having 1 to 2 carbon atoms; a haloalkyl group, such as a trifluoromethyl group or a 2,2,2-trifluoroethyl group, having 1 to 2 carbon atoms, or an aryl group, such as a phenyl group or a p-tolyl group, having 6 to 9 carbon atoms. And m is more preferably either 1 or 2, and further preferably 1.

The reason why the number of carbon atoms of $R_1$ is 7 or less is the same as in the case of Chemical Formula 2 described above.

A preferable example of the sulfonic acid ester compound shown in Chemical Formula 2 is a compound in which $R_1$ and $R_2$ each represents a methyl group. In addition, n in Chemical Formula 2 is preferably 1 to 3. Therefore, preferable examples of the sulfonic acid ester compound shown in Chemical Formula 2 are 1,4-butanediol dimethanesulfonate and 1,2-propanediol dimethanesulfonate.

A preferable example of the sulfonic acid ester compound shown in Chemical Formula 3 is a compound in which $R_1$ and $R_2$ each represents a methyl group. In addition, m and p in Chemical Formula 3 are preferably both 1. Therefore, a preferable example of the sulfonic acid ester compound shown in Chemical Formula 3 is 2-butyne-1,4-diol dimethanesulfonate.

A preferable example of the sulfonic acid ester compound shown in Chemical Formula 4 is a compound in which $R_1$ represents a methyl group. In addition, m in Chemical Formula 4 is preferably 1. Therefore, the most preferable example of the sulfonic acid ester compound shown in Chemical Formula 4 is 2-propynyl methanesulfonate.

The battery of the present invention uses a positive electrode active material made of a lithium compound capable of absorbing and desorbing lithium, and preferably made of a mixture of a lithium-cobalt composite oxide and a lithium-manganese-nickel composite oxide.

The lithium-cobalt composite oxide is preferably a lithium-cobalt composite oxide containing zirconium and magnesium. The lithium-manganese-nickel composite oxide preferably has a layered structure.

The battery of the present invention uses a negative electrode active material made of carbonaceous material capable of absorbing and desorbing lithium, such as artificial graphite or natural graphite.

The battery of the present invention uses an electrolyte salt in a non-aqueous electrolyte such as $LiPF_6$, $LiBF_4$, $LiCF_3SO_3$, $LiN(CF3SO_2)_2$, $LiN(C_2F_5SO_2)_2$, $LiN(CF_3SO_2)(C_4F_9SO_2)$, $LiC(CF_3SO_3)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof. These electrolyte salts are used at a concentration of preferably 0.1 to 2 M, and more preferably 0.5 to 1.5 M in the non-aqueous solvent.

The material of the non-aqueous solvent of the non-aqueous electrolyte is not particularly limited, and can be, for example, any of the following: ethylene carbonate, propylene carbonate, butylene carbonate, vinylene carbonate, dimethyl carbonate, methyl ethyl carbonate, diethyl carbonate, methyl propyl carbonate, methyl butyl carbonate, ethyl propyl carbonate, ethyl butyl carbonate, dipropyl carbonate, fluoroethylene carbonate, 1,2-cyclohexyl carbonate, cyclopentanone, sulfolane, 3-methylsulfolane, 2,4-dimethylsulfolane, 3-methyl-1,3-oxazolidine-2-one, γ-butyrolactone, γ-valerolactone, 1,2-dimethoxyethane, tetrahydrofuran, 2-methyltetrahydrofuran, 1,3-dioxolane, methyl acetate, ethyl acetate, and mixtures thereof.

In order to increase the effect of charge-discharge, it is preferable use a combination of cyclic carbonate and chain carbonate shown below. Examples of the cyclic carbonate includes ethylene carbonate (EC), propylene carbonate (PC), and vinylene carbonate (VC), and examples of the chain carbonate include dimethyl carbonate (DMC), methyl ethyl carbonate (MEC), and diethyl carbonate (DEC). Although not limited, the cyclic carbonate and the chain carbonate are in a mass ratio of preferably 1:9 to 5:5, and more preferably 2:8 to 4:6. It is preferable to use, as chain carbonate, asymmetric carbonate such as methyl ethyl carbonate.

In the present specification, 1,3-dioxane and a sulfonic acid ester compound are treated as additives belonging neither to a non-aqueous solvent nor an electrolyte salt.

The battery of the present invention uses a separator which can be made of any known material such as a porous polyolefin film.

The non-aqueous electrolyte secondary battery of the present invention is characterized by the composition of the non-aqueous electrolyte, and therefore not limited in shape or use. Specific examples of the battery include prismatic batteries, cylindrical batteries, and button batteries.

The best mode of the present invention is described more specifically as follows using examples. It should be understood, however, that the invention is not limited to the following examples and can be implemented in various forms within the scope of the invention.

EXAMPLE 1

Production of the Positive Electrode

First, active material "A", which represents a lithium-cobalt composite oxide used as a component of a positive electrode active material, was produced as follows.

Cobalt (Co), 0.15 mol % of zirconium (Zr), and 0.5 mol % of magnesium (Mg) were coprecipitated as hydroxide, subjected to a pyrolysis reaction so as to obtain a tricobalt tetroxide ($Co_3O_4$) containing zirconium and magnesium.

The tricobalt tetroxide was mixed with lithium carbonate and heated at 850° C. for 24 hours in air atmosphere. The resultant mixture was pulverized to an average particle size of 14 μm in a mortar so as to produce the lithium-cobalt composite oxide (active material "A") containing zirconium and magnesium.

A lithium-manganese-nickel composite oxide (active material "B"), which is another component of the positive electrode active material was produced as follows.

Lithium carbonate ($Li_2CO_3$) was mixed with a coprecipitated hydroxide expressed by $Ni_{0.33}Mn_{0.33}Co_{0.34}(OH)_2$, heated at 1000° C. for 20 hours in air atmosphere, and pulverized to an average particle size of 5 μm in a mortar. As a result, the lithium-manganese-nickel composite oxide (active material "B") was produced. The crystal structure of active material "B" was measured by X-ray diffraction method to confirm that active material "B" has a layered structure.

The aforementioned active materials "A" and "B" were mixed in a mass ratio of 7:3 so as to prepare a positive electrode active material. Then, 94 parts by mass of the positive electrode active material was mixed with 3 parts by mass of carbon powder as a conductive agent and 3 parts by mass of polyvinylidene fluoride powder as a binder. The resultant mixture was mixed with an N-methylpyrrolidone (NMP) solution so as to prepare slurry. The slurry was applied to both sides of an aluminum current collector using a doctor blade method, and dried. As a result, an active material layer was formed on both sides of the positive electrode current collector, thereby producing a positive electrode plate. The positive electrode plate was pressed by a roller-press machine so as to produce a positive electrode having a short side of 29.0 mm in length.

Production of the Negative Electrode

Graphite and styrene-butadiene rubber (SBR) (styrene:butadiene=1:1) as a binder were dispersed in water, and then carboxymethylcellulose (CMC) as a viscosity improver was added thereto so as to prepare a slurry. The compounding ratio between the carbon component, SBR, and CMC was controlled to be 95:3:2 (dry mass ratio). The slurry was applied to both sides of a copper foil using a doctor blade method, dried, and pressed to produce a negative electrode having a short side of 31.0 mm in length.

Preparation of the Non-Aqueous Electrolyte $LiPF_6$ as an electrolytic solution was dissolved at a concentration of 1 mol/L in a non-aqueous electrolyte solvent, which is a mixture of ethylene carbonate (EC) propylene carbonate (PC), diethyl carbonate (DEC), and methyl ethyl carbonate (MEC) in a volume ratio of 20:5:45:30. Then, vinylene carbonate (VC) was added to the solvent in such a manner as to be 2% by mass of the non-aqueous electrolyte. At this moment, the basic structure of the electrolytic solution was $LiPF_6$:EC:PC:MEC:DEC:VC in a mass ratio of 12.6:21.0:4.8:36.2:23.4:2.0.

Next, 1.0% by mass of 1,3-dioxane and 0.5% by mass of pentafluorophenyl methanesulfonate shown in Chemical Formula 1 were added to the non-aqueous electrolyte.

Assembly of the Battery

The positive and negative electrode plates were wound with a separator interposed therebetween to form an electrode assembly. The separator is an olefin resin-based microporous separator. The electrode assembly was housed in a metal prismatic outer can and filled with the electrolytic solution prepared as above. Thus, prismatic lithium ion secondary batteries (5 mm×34 mm×36 mm, design capacity: 820 mAh) were completed.

EXAMPLE 2

Non-aqueous electrolyte secondary batteries were prepared in the same manner as in Example 1 except that pentafluorophenyl methanesulfonate shown in Chemical Formula 1 added to the non-aqueous electrolyte was 2.0% by mass.

EXAMPLE 3

Non-aqueous electrolyte secondary batteries were prepared in the same manner as in Example 1 except that pentafluorophenyl methanesulfonate shown in Chemical Formula 1 added to the non-aqueous electrolyte was 3.0% by mass.

EXAMPLE 4

Non-aqueous electrolyte secondary batteries were prepared in the same manner as in Example 1 except that pentafluorophenyl methanesulfonate shown in Chemical Formula 1 added to the non-aqueous electrolyte was 0.2% by mass.

EXAMPLE 5

Non-aqueous electrolyte secondary batteries were prepared in the same manner as in Example 1 except that 1,3-dioxane and pentafluorophenyl methanesulfonate shown in Chemical Formula 1 added to the non-aqueous electrolyte were each 0.5% by mass.

EXAMPLE 6

Non-aqueous electrolyte secondary batteries were prepared in the same manner as in Example 1 except that 1,3-dioxane and pentafluorophenyl methanesulfonate shown in Chemical Formula 1 added to the non-aqueous electrolyte were 2.0% by mass and 0.5% by mass, respectively.

EXAMPLE 7

Non-aqueous electrolyte secondary batteries were prepared in the same manner as in Example 1 except that pentafluorophenyl methanesulfonate shown in Chemical Formula 1 was replaced by the same amount (0.5% by mass) of 1,4-butanediol dimethanesulfonate, which is one example of the sulfonic acid ester compound shown in Chemical Formula 2.

EXAMPLE 8

Non-aqueous electrolyte secondary batteries were prepared in the same manner as in Example 1 except that pentafluorophenyl methanesulfonate shown in Chemical Formula 1 was replaced by the same amount (0.5% by mass) of 2-butyne-1,4-diol dimethanesulfonate, which is one example of the sulfonic acid ester compound shown in Chemical Formula 3.

COMPARATIVE EXAMPLE 1

Non-aqueous electrolyte secondary batteries were prepared in the same manner as in Example 1 except that neither 1,3-dioxane nor a sulfonic acid ester compound was added.

COMPARATIVE EXAMPLE 2

Non-aqueous electrolyte secondary batteries were prepared in the same manner as in Example 1 except that 0.5% by mass of pentafluorophenyl methanesulfonate shown in Chemical Formula 1 was added and that 1,3-dioxane was not added.

COMPARATIVE EXAMPLE 3

Non-aqueous electrolyte secondary batteries were prepared in the same manner as in Example 1 except that pentafluorophenyl methanesulfonate shown in Chemical Formula 1 was replaced by the same amount (0.5% by mass) of 1,4-butanediol dimethanesulfonate and that 1,3-dioxane was not added.

COMPARATIVE EXAMPLE 4

Non-aqueous electrolyte secondary batteries were prepared in the same manner as in Example 1 except that 1% by mass of 1,3-dioxane was added to the non-aqueous electrolyte and that a sulfonic acid ester compound was not added.

The batteries of the aforementioned Examples and Comparative Examples were tested for their charge-discharge cycle characteristics and high-temperature storage characteristics as follows.

Test for Charge-Discharge Cycle Characteristics

The batteries produced as above were subjected to a charge-discharge cycle test in a constant temperature chamber of 45° C. Note that in the following description of this test, all voltage values indicate battery voltage values.

First, the prismatic lithium ion batteries were charged at a constant current of 1 It (820 mA) until the battery voltage reached 4.38V. Then, these batteries were charged up to 1/50 It (16 mA) at a constant voltage of 4.38V (equivalent to a positive-electrode charge potential of about 4.48V versus lithium). Next, the batteries were discharged at a constant current of 1 It (820 mA) until the battery voltage reached 3.0V. The discharge capacity at this moment was determined as an initial capacity. These series of charge-discharge operations are hereinafter referred to as one cycle. The discharge capacities of the batteries were measured after 100 cycles and after 300 cycles. The capacity residual rate (%) after these cycles was calculated based on the calculation formula below, and is shown as a value indicating cycle characteristics.

Capacity residual rate (%)=(discharge capacity after 100 or 300 cycles/initial capacity)×100

Test for High-Temperature Storage Characteristics

The batteries were charged at a constant current of 1 It (820 mA) at 25° C. until the battery voltage reached 4.38V, and then charged at a constant voltage of 4.38V at 25° C. until the current value reached 1/50 It (16 mA). The batteries thus charged were stored for 20 days in a constant temperature chamber of 60° C., and then cooled to 25° C. so as to measure the thicknesses of the batteries.

After the storage, the batteries were charged under the same conditions as before the storage, and then discharged at a constant current of 1 It (820 mA) until the battery voltage reached 3.0V. The discharge capacities at this moment were measured. The post-storage capacity return rate (%) after storage of each battery in the charged state was calculated based on the calculation formula below and is shown as a value indicating storage characteristics.

Post-storage capacity return rate (%)=(discharge capacity after storage in the charged state/initial capacity)×100

Tables 1, 2, and 3 below show the case of adding pentafluorophenyl methanesulfonate, the case of adding 1,4-butanediol dimethanesulfonate, and the case of adding 2-butyne-1,4-diol dimethanesulfonate, respectively.

TABLE 1

[pentafluorophenyl methanesulfonate]

| | 1,3-dioxane (% by mass) | pentafluoro-phenyl methane-sulfonate (% by mass) | initial capacity (mAh) | cycle characteristics <capacity residual rate(%)> after 100 cycles | cycle characteristics <capacity residual rate(%)> after 300 cycles | storage characteristics post-storage capacity return rate (%) | battery thickness |
|---|---|---|---|---|---|---|---|
| Comparative Example 1 | 0 | 0 | 853 | — | 73 | 73 | — |
| Comparative Example 2 | 0 | 0.5 | 852 | 92 | 75 | 74 | less than 6 mm |
| Comparative Example 4 | 1.0 | 0 | 847 | 92 | 79 | 85 | less than 6 mm |
| Example 1 | 1.0 | 0.5 | 854 | 93 | 83 | 87 | less than 6 mm |
| Example 2 | 1.0 | 2.0 | 858 | 93 | 84 | 84 | less than 6 mm |
| Example 3 | 1.0 | 3.0 | 857 | 94 | 85 | 81 | 6 mm or more |
| Example 4 | 1.0 | 0.2 | 853 | 93 | 83 | 86 | less than 6 mm |
| Example 5 | 0.5 | 0.5 | 857 | 93 | 84 | 85 | less than 6 mm |
| Example 6 | 2.0 | 0.5 | 852 | 92 | 82 | 87 | less than 6 mm |

A comparison between Comparative Examples 1 and 2 indicates that the addition of pentafluorophenyl methanesulfonate alone hardly contributes to the improvement of the capacity residual rate and post-storage capacity return rate after 300 cycles. A comparison between Comparative Examples 1 and 4 indicates that the addition of 1,3-dioxane improves the capacity residual rate after 300 cycles and post-storage capacity return rate, and that the addition of 1,3-dioxane alone decreases the initial capacity. In contrast, Example 1 using both 1,3-dioxane (1.0% by mass) and pentafluorophenyl methanesulfonate (0.5% by mass) provides excellent results of both the initial capacity and the capacity residual rate and post-storage capacity return rate after 300 cycles. Examples 2 to 6 using both 1,3-dioxane and pentafluorophenyl methanesulfonate provide the same excellent results as Example 1.

More specifically, the initial capacities of Examples 1 to 6 are the same or larger than those of Comparative Examples 1, 2, and 4 whereas the cycle characteristics of Examples 1 to 6 are much better than those of Comparative Examples 2 and 4 after 300 cycles, although their difference is small after 100 cycles.

However, in Example 3 using 3.0% by mass of pentafluorophenyl methanesulfonate, the batteries tend to expand and to increase in thickness. Although not shown in Table 1, it has been confirmed that less than 0.1% by mass of a sulfonic acid ester compound such as pentafluorophenyl methanesulfonate decreases the effect of reducing the initial capacity which is expected to be achieved by the addition of 1,3-dioxane.

As a result, the content of a sulfonic acid ester compound such as pentafluorophenyl methanesulfonate in the non-aqueous electrolyte is preferably in the range of 0.1 to 2.0% by mass.

It has also been confirmed that when the 1,3-dioxane content of the non-aqueous electrolyte is less than 0.3% by mass, the post-storage capacity return rate is not improved sufficiently, whereas when it exceeds 3% by mass, the cycle characteristics tend to deteriorate. As a result, the 1,3-dioxane content of the non-aqueous electrolyte is preferably in the range of 0.3 to 3% by mass, and more preferably in the range of 0.5 to 2.0% by mass.

TABLE 2

[1,4-butanediol dimethanesulfonate]

| | 1,3-dioxane (% by mass) | 1,4-butane-dioldimethane-sulfonate (% by mass) | initial capacity (mAh) | cycle characteristics <capacity residual rate % after 300 cycles> | storage characteristics <post-storage capacity return rate(%)> |
|---|---|---|---|---|---|
| Comparative Example 1 | 0 | 0 | 853 | 73 | 73 |
| Comparative Example 3 | 0 | 0.5 | 855 | 74 | 73 |
| Comparative Example 4 | 1.0 | 0 | 847 | 79 | 85 |
| Example 7 | 1.0 | 0.5 | 857 | 83 | 86 |

Similar to Table 1, the addition of 1,4-butanediol dimethanesulfonate, which is a sulfonic acid ester compound, together with 1,3-dioxane results in much higher initial capacities (Example 7) than the addition of 1,3-dioxane alone (Comparative Example 4).

Furthermore, the results of the capacity residual rate after 300 cycles and post-storage capacity return rate are much better in the case of adding 1,4-butanediol dimethanesulfonate together with 1,3-dioxane (Example 7) than in the case of adding 1,3-dioxane alone (see Comparative Examples 1 and 4). The results of the initial capacity, capacity residual rate after 300 cycles, and post-storage capacity return rate are almost the same in the case of adding 1,4-butanediol dimethanesulfonate alone (Comparative Example 3) as in the case of adding neither 1,3-dioxane nor 1,4-butanediol dimethanesulfonate (Comparative Example 1). Furthermore, the addition of 0.5% by mass of 1,4-butanediol dimethanesulfonate does not increase the thickness of the batteries (see Comparative Examples 1,3,4 and Example 7).

TABLE 3

[2-butyne-1,4-diol dimethanesulfonate]

| | 1,3-dioxane (% by mass) | 2-butyne-1,4-diol dimethane-sulfonate (% by mass) | initial capacity | cycle characteristics <capacity residual rate % after 300 cycles> | storage characteristics <post-storage capacity return rate (%)> |
|---|---|---|---|---|---|
| Comparative Example 1 | 0 | 0 | 853 | 73 | 73 |
| Example 8 | 1.0 | 0.5 | 853 | 81 | 85 |

A combination of 1,3-dioxane and 2-butyne-1,4-diol dimethanesulfonate, which is another sulfonic acid ester compound has the same effects as the combination of 1,3-dioxane and 1,4-butanediol dimethanesulfonate in improvement of the cycle characteristics and storage characteristics. Furthermore, the addition of 2-butyne-1,4-diol dimethanesulfonate does not substantially increase the thickness of the batteries.

INDUSTRIAL APPLICABILITY

The present invention thus provides a non-aqueous electrolyte secondary battery having a high initial capacity and excelling in cycle characteristics and storage characteristics even when charged until the potential of the positive electrode active material exceeds as high as 4.3V versus lithium. Hence, the invention has high industrial applicability.

What is claimed is:

1. A non-aqueous electrolyte secondary battery comprising:
   a positive electrode having a positive electrode active material;
   a negative electrode having a negative electrode active material; and
   a non-aqueous electrolyte containing a non-aqueous solvent, an electrolyte salt, 1,3-dioxane, and a sulfonic acid ester compound;
   wherein the 1,3-diopxane content of the non-aqueous electrolyte is in range of 0.3 to 3% by mass.

2. The non-aqueous electrolyte secondary battery of claim 1, wherein
   the sulfonic acid ester compound is a compound selected from the group consisting of pentafluorophenyl methanesulfonate shown in Chemical Formula 1 and compounds shown in Chemical Formulas 2, 3, and 4 below:

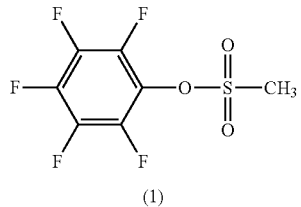

Chemical Formula 1

(1)

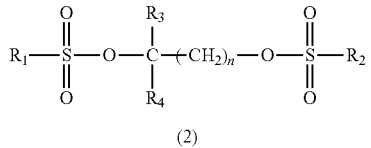

Chemical Formula 2

(2)

where $R_1$ and $R_2$ each represents an alkyl group, a haloalkyl group, or an aryl group, $R_3$ and $R_4$ each represents a hydrogen atom or a methyl group, and n is an integer of 1 to 5;

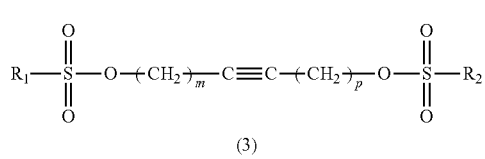

Chemical Formula 3

(3)

where $R_1$ and $R_2$ each represents an alkyl group, a haloalkyl group, or an aryl group, and m and p are each either 1 or 2;

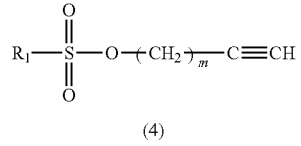

Chemical Formula 4

(4)

where $R_1$ is an alkyl group, a haloalkyl group, or an aryl group, and m is either 1 or 2.

3. The non-aqueous electrolyte secondary battery of claim 2, wherein
   (i) the sulfonic acid ester compound includes at least one of the compounds shown in Chemical Formulas 2, 3, and 4;
   (ii) in Chemical Formula 2, $R_1$ and $R_2$ each represents an alkyl group having 1 to 6 carbon atoms, a haloalkyl group having 1 to 6 carbon atoms, or an aryl group having 6 to 12 carbon atoms, $R_3$ and $R_4$ each represents a hydrogen atom or a methyl group, and n is an integer of 1 to 5;

(iii) in Chemical Formula 3, $R_1$ and $R_2$ each represents an alkyl group having 1 to 6 carbon atoms, a haloalkyl group having 1 to 6 carbon atoms, or an aryl group having 6 to 12 carbon atoms, and m and p are each either 1 or 2; and (iv) in Chemical Formula 4, $R_1$ is an alkyl group having 1 to 6 carbon atoms, a haloalkyl group having 1 to 6 carbon atoms, or an aryl group having 6 to 12 carbon atoms, and m is either 1 or 2.

4. The non-aqueous electrolyte secondary battery of claim 3, wherein
the 1,3-dioxane content of the non-aqueous electrolyte is in a range of 0.5 to 2% by mass.

5. The non-aqueous electrolyte secondary battery of claim 4, wherein
the sulfonic acid ester compound content of the non-aqueous electrolyte is preferably in a range of 0.1 to 3% by mass.

6. The non-aqueous electrolyte secondary battery of claim 5, wherein
the positive electrode active material has a potential of more than 4.3V and not more than 5.1V versus lithium.

7. The non-aqueous electrolyte secondary battery of claim 6, wherein
the positive electrode active material is a mixture of a lithium-cobalt composite oxide and a lithium-manganese-nickel composite oxide, the lithium-cobalt composite oxide containing zirconium and magnesium, and the lithium-manganese-nickel composite oxide having a layered structure.

8. The non-aqueous electrolyte secondary battery of claim 1, wherein
the sulfonic acid ester compound is a compound selected from the group consisting of pentafluorophenyl methanesulfonate, 1,4-butanediol dimethanesulfonate, 1,2-propanediol dimethanesulfonate, and 2-butyne-1,4-diol dimethanesulfonate.

9. The non-aqueous electrolyte secondary battery of claim 8, wherein
the 1,3-dioxane content of the non-aqueous electrolyte is in a range of 0.5 to 2% by mass.

10. The non-aqueous electrolyte secondary battery of claim 9, wherein
the sulfonic acid ester compound content of the non-aqueous electrolyte is in a range of 0.1 to 3% by mass.

11. The non-aqueous electrolyte secondary battery of claim 10, wherein
the positive electrode active material has a potential of more than 4.3V and not more than 5.1V versus lithium.

12. The non-aqueous electrolyte secondary battery of claim 11, wherein
the positive electrode active material is a combination of a lithium-cobalt composite oxide and a lithium-manganese-nickel composite oxide, the lithium-cobalt composite oxide including zirconium and magnesium, and the lithium-manganese-nickel composite oxide having a layered structure.

* * * * *